United States Patent [19]

Hunter et al.

[11] Patent Number: 5,280,097

[45] Date of Patent: * Jan. 18, 1994

[54] LAMINATED COMPOSITES OF POLYUREA-CELLULOSE AND METHODS FOR THEIR MANUFACTURE

[75] Inventors: Frank R. Hunter, Bellevue; James F. L. Lincoln, Kent; David W. Park, Puyallup, all of Wash.

[73] Assignee: Weyerhaeuser Company, Tacoma, Wash.

[ * ] Notice: The portion of the term of this patent subsequent to Apr. 16, 2008 has been disclaimed.

[21] Appl. No.: 895,376

[22] Filed: Jun. 8, 1992

Related U.S. Application Data

[63] Continuation-in-part of Ser. No. 618,723, Nov. 27, 1990, Pat. No. 5,140,086.

[51] Int. Cl.$^5$ .............. C08H 5/04; B32B 21/06; B32B 21/14; B32B 23/04
[52] U.S. Cl. .................. 527/103; 527/301; 428/534; 428/535; 428/536; 428/537.1
[58] Field of Search .......... 527/103, 301; 428/534, 428/535, 536, 537.1

[56] References Cited

U.S. PATENT DOCUMENTS

| 3,666,593 | 5/1972 | Lee | 156/285 |
|---|---|---|---|
| 4,032,483 | 6/1977 | Hartman | 527/301 |
| 4,344,798 | 8/1982 | Gaul et al. | 106/123 |
| 4,359,507 | 11/1982 | Gaul et al. | 428/425.1 |
| 4,361,662 | 11/1982 | Gaul et al. | 524/14 |
| 4,414,361 | 11/1983 | Gaul et al. | 524/702 |
| 4,486,557 | 12/1984 | Gaul et al. | 523/446 |
| 5,008,359 | 4/1991 | Hunter | 527/301 |
| 5,140,086 | 8/1992 | Hunter et al. | 527/301 |

FOREIGN PATENT DOCUMENTS 0304273 2/1989 European Pat. Off. .
2075038 11/1981 United Kingdom .

OTHER PUBLICATIONS

Gaul et al., "Novel Isocyanate Binder Systems for Composite Wood Panels," Proceedings of the S.P.I. International Technical/Marketing Conference, pp. 399–407 (1983).
Tsuzuki et al., "New Reactions of Organic Isocyanates. I. Reaction with Alkylene Carbonates," J. Org. Chem. 25:1009 (1960).

Primary Examiner—Nathan M. Nutter
Attorney, Agent, or Firm—Klarquist, Sparkman Campbell, Leigh & Whinston

[57] ABSTRACT

A laminated product has an organic polymer layer on at least one surface of a substrate of cellulosic material impregnated with polyisocyanate. The substrate is preferably made from substantially delignified cellulosic material and an isocyanate resin. The isocyanate resin comprises a polyisocyanate, preferably PMDI, and may include a miscible organic solvent, preferably one such as propylene carbonate having a high boiling point and low flammability and toxicity. The substrate may be cured with an uncured overlay sheet positioned on the cured substrate and then cured to bond the substrate and overlay. Alternatively, a cured overlay may be adhesively or otherwise secured to a previously cured substrate. As yet another alternative, an uncured overlay sheet and uncured substrate may be placed in position and simultaneously cured. An overlay may be positioned on one or both major surfaces of a substrate sheet.

18 Claims, 14 Drawing Sheets

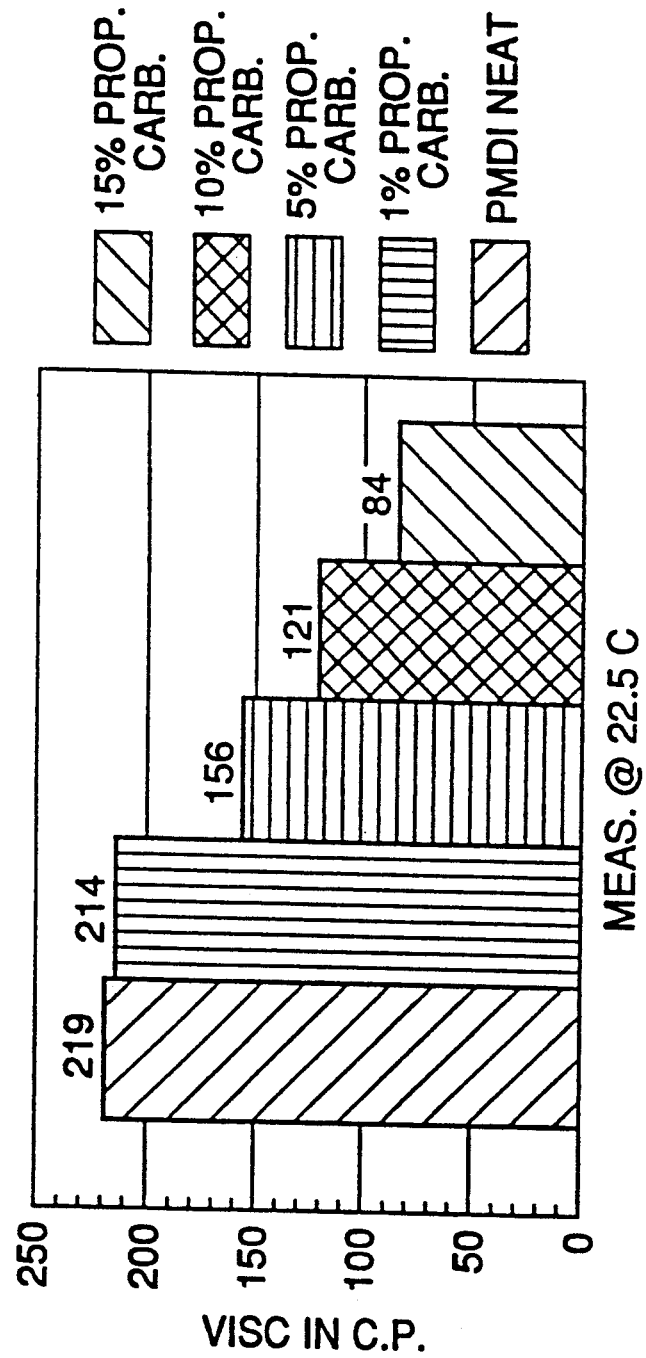

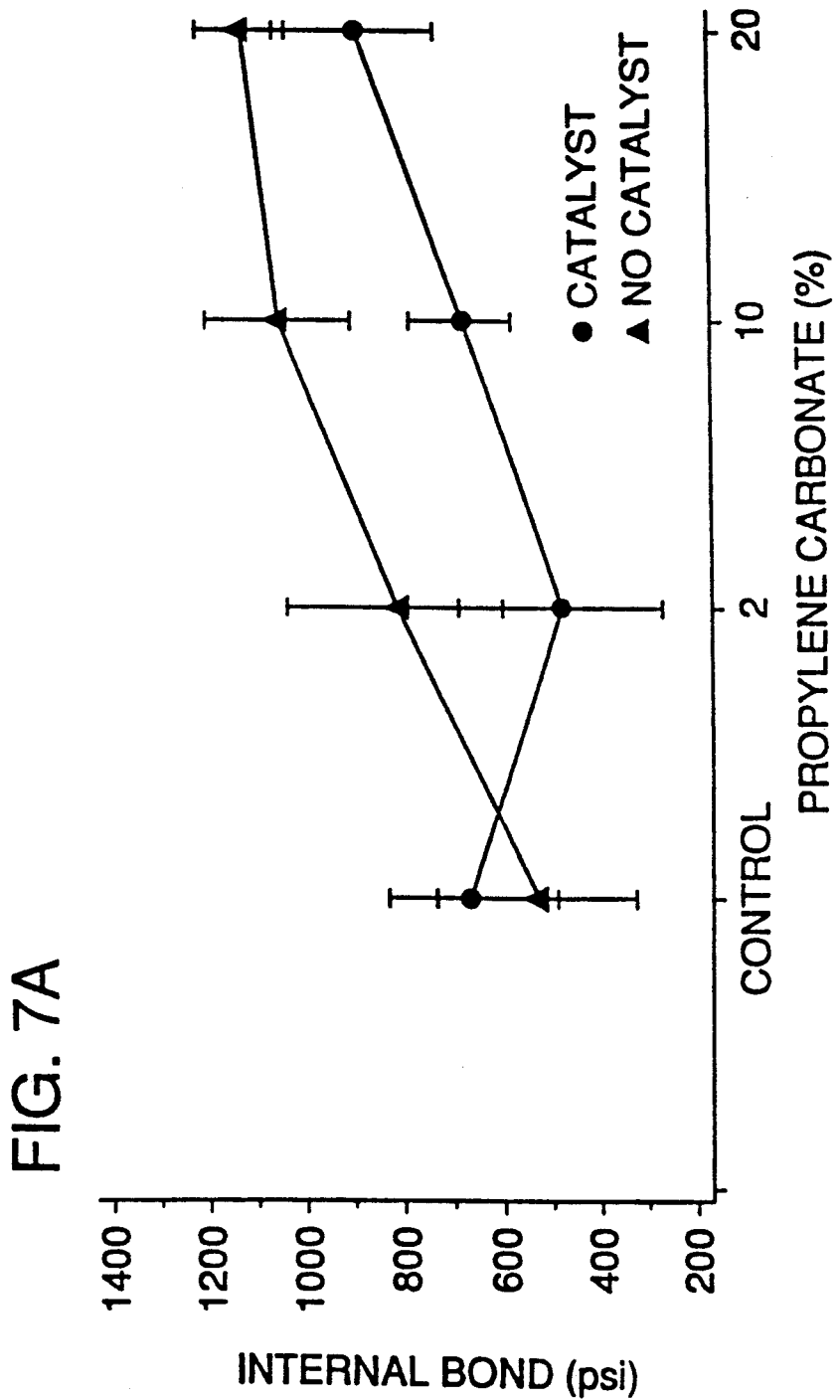

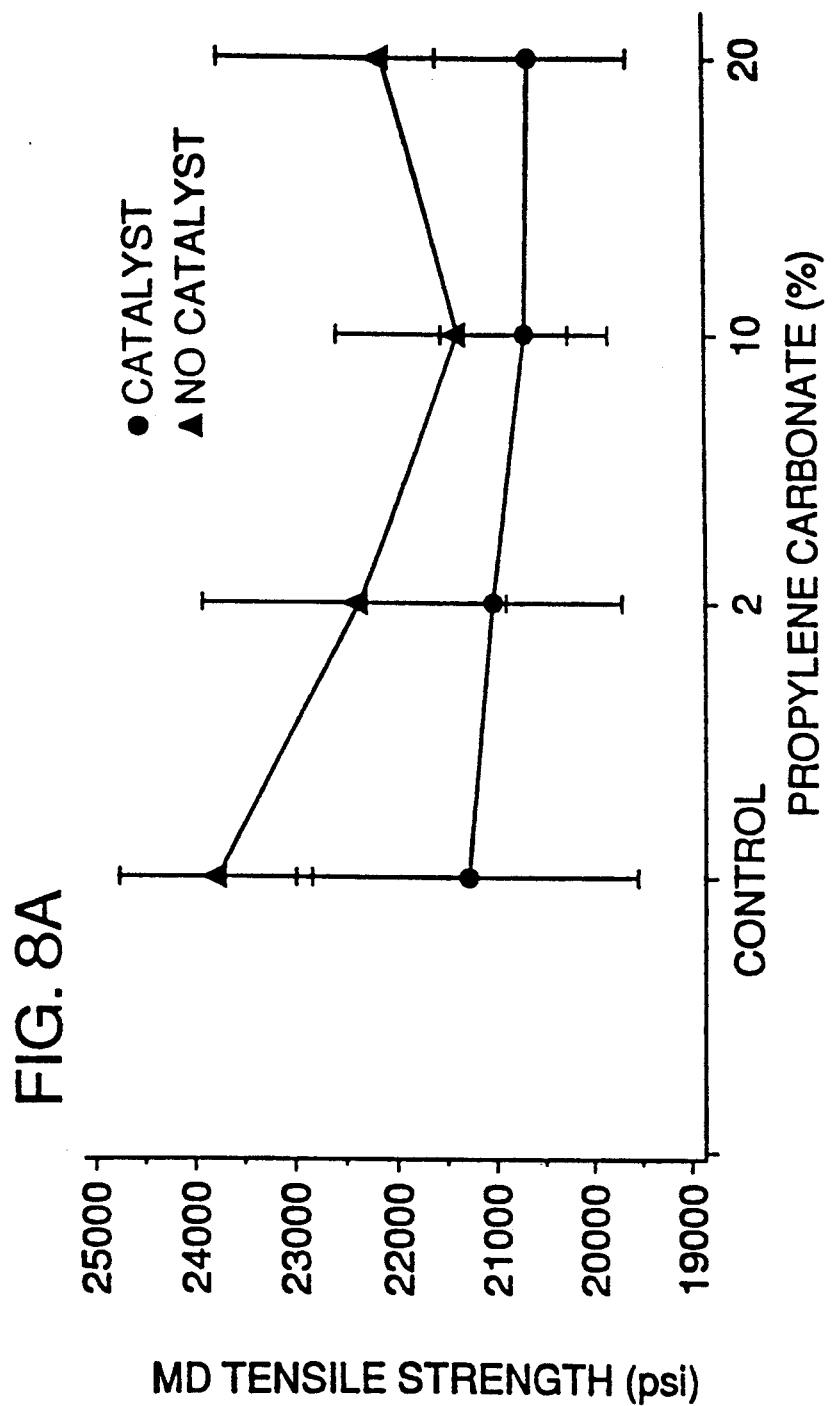

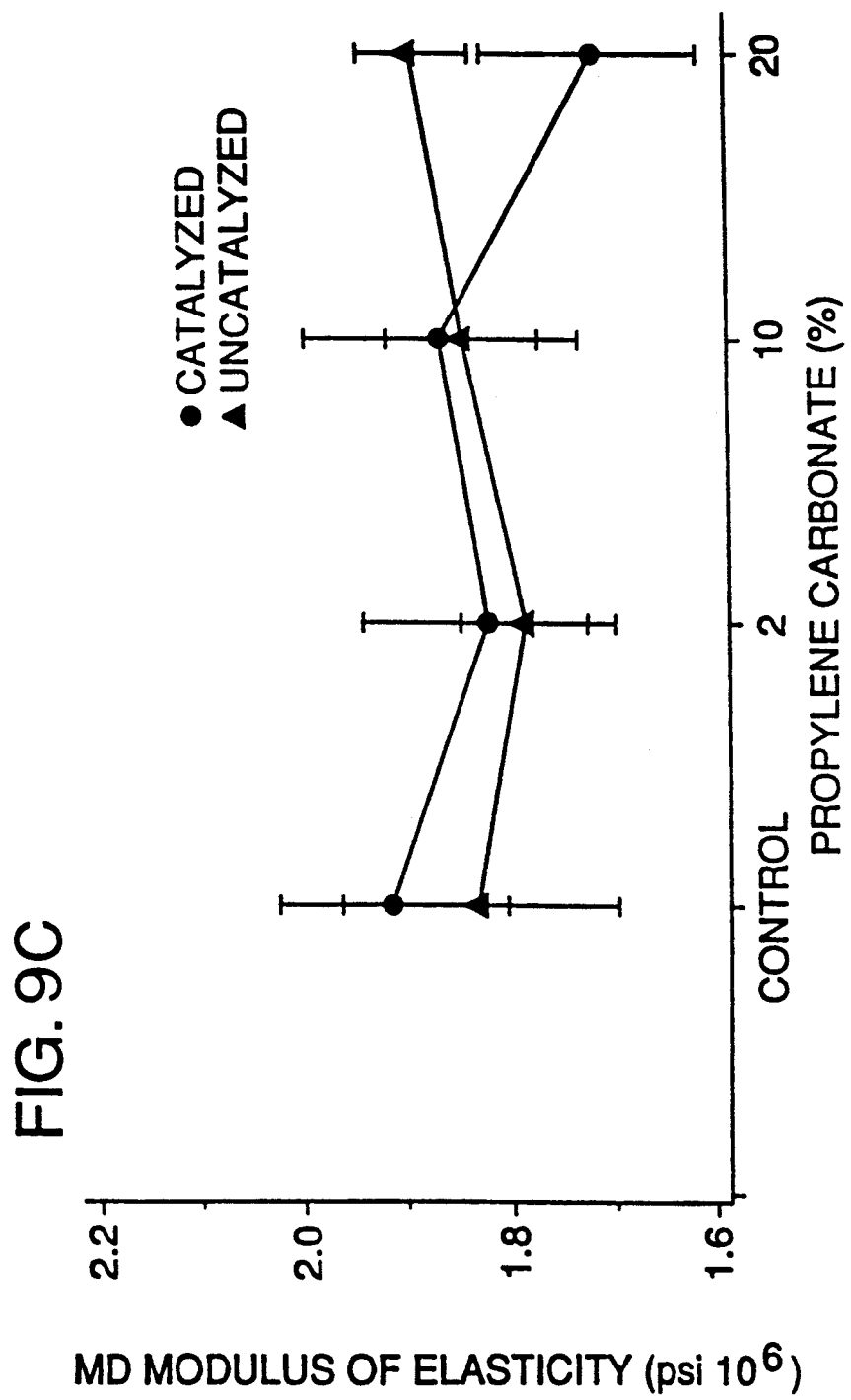

LAMINATED COMPOSITES OF POLYUREA-CELLULOSE AND METHODS FOR THEIR MANUFACTURE

CROSS REFERENCE TO RELATED APPLICATION

This application is a continuation-in-part of co-pending U.S. patent application Ser. No. 07/618,723, filed Nov. 27, 1990 and now U.S. Pat. No. 5,140,086.

FIELD OF THE INVENTION

This invention relates generally to composite materials having laminae formed from organic polymers.

BACKGROUND OF THE INVENTION

Polyisocyanates have had wide study as adhesives and binders in forming composite materials. For example, polyisocyanates have been used to manufacture wood products such as hardboard and particle board. Each such product generally has a defined scope of industrial utility, rendering it useful for certain applications but not others.

Representative prior disclosures of polyisocyanate-containing composite materials include the following:

U.S. Pat. No. 3,666,593 to Lee discloses overlaying a rigid substrate, such as wood, metal, plastic, or asbestos board, with one or more layers of polyisocyanate-impregnated paper. The polyisocyanate-impregnated paper is cured at 100 to 350 psi at a temperature from 280° to 340° F., U.S. Pat. No. 4,359,507 to Gaul et al. discloses particle boards made using lignified cellulose and an adhesive binder polyisocyanate and a viscosity-reducing diluent such as ethylene carbonate, propylene carbonate, or lignin. The binder has 20 to 95% w/w polyisocyanate, preferably 50 to 75% w/w, relative to the mass of the mixture of polyisocyanate and diluent.

U.S. Pat. Nos. 4,486,557, 4,344,798, 4,361,662, and 4,414,361 to Gaul et al. disclose various adhesive binder composition for lignified cellulose comprising polyisocyanate and one or more diluents that serve principally to "extend" the polyisocyanate resin.

Gaul et al., "Novel Isocyanate Binder Systems for Composite Wood Panels," *Proceedings of the S.P.I. International Technical/Marketing Conference*, San Diego, Cal., Nov. 2–4, 1983, pp. 389–407, teaches that dilution of polyisocyanates such as poly(diphenylmethane diisocyanate) (termed "PMDI") with progressively increased amounts of a miscible organic diluent yields particle boards exhibiting progressively decreased internal bonding strength. PMDI dilution also results in decreased modulus of rupture and modulus of elasticity.

European patent application No. 0,304,273 to Younes discloses composite materials in which a lamina of metal, cellulose, plastic, glass, or ceramic is compression-molded with a rigid polyisocyanurate lamina. The amount of cyclic alkylene carbonate is about 2 to 50% w/w, preferably 20 to 35% w/w, relative to the mass of the reaction mixture.

U.S. Pat. No. 5,008,359 to Hunter discloses a polyurea-cellulosic composite material made using an essentially uncatalyzed polyisocyanate resin.

It is also known to make laminated composites having a phenolic resin impregnated paper substrate with an overlay of a melamine containing material. These materials have been widely applied, for example as countertop coverings in residential and commercial establishments. One such prior art covering is sold under the brand name Wilsonart ®, while another is sold under the brand name Formica ®. The precise construction of these materials is unknown, but they are understood to be formed of a melamine-plastic overlay on a phenolic impregnated paper substrate. These materials must be able to resist denting or deformation from objects dropped thereon. Although the Wilsonart ® covering material has been well received, improvements in the durability, cost reduction and environmental impact of such materials would be desirable.

Therefore, a need exists for improved materials of this type.

SUMMARY OF THE INVENTION

In accordance with the present invention, a polyisocyanate impregnated cellulosic material substrate is provided with an overlay on at least one major exterior surface thereof of an organic polymer material. Melamine-plastic and polyester are two preferred overlay materials. The substrate is also preferably formed of plural layers of the cellulosic material which are laminated together with the polymer overlay to form the composite structure. In one preferred manufacturing approach, the polyisocyanate substrate is formed and cured. Thereafter, an uncured polymer overlay sheet is placed on top of one or both of the major surfaces of the substrate. Through the application of heat and pressure, the polymer material is cured and simultaneously bonds to the substrate. Bonding is believed to be of a mechanical nature with the polymer flowing into and mechanically engaging minute or microscopic voids in the surface of the substrate during curing of the polymer. Alternatively, a cured polymer overlay may be adhesively secured to the substrate, but this involves the added cost of the adhesive and the added adhering step. As yet another alternative, the polyisocyanate impregnated substrate and overlay may be positioned in the desired overlaying relationship and simultaneously cured.

The most preferred procedure for forming the substrate involves the production of a polyurea-cellulose composite substrate material from a substantially delignified cellulosic material and an isocyanate resin comprising at least one polyisocyanate compound diluted with an organic solvent miscible with the polyisocyanate. The solvent constitutes a maximum of about 20% w/w of the polyisocyanate and the isocyanate resin constitutes about 8–20% w/w of the cellulosic material. The cellulosic material, which preferably has a maximum moisture content of 7% w/w, is preferably uniformly impregnated with the resin, then cured at a temperature within a range of about 105°–245° C. for five minutes or less at a pressure of about 130–1200 psig.

The polyurea-cellulose composite substrate can comprise single or multiple plies or laminae of polyisocyanate-impregnated cellulosic material. To produce a plied composite, the impregnated laminae, before curing, are typically arranged into a laminarly stacked configuration before curing.

The polyisocyanate is preferably poly(diphenylmethane diisocyanate), but can be selected from the group consisting of lower aliphatic, alicyclic, and aromatic polyisocyanates, and mixtures thereof. The solvent is preferably propylene carbonate but can be selected from the group consisting of alkylene carbonates, aromatics, halogenated aromatics, ethers, ketones, and alkyl acetates. If desired, a catalyst can be used, for example, selected from the group consisting of aliphatic tertiary amines, aliphatic metal complexes, and acetyl acetonates, at a concentration in the isocyanate resin of about 0.1 to about 0.5% w/w. The cellulosic material is preferably selected from the group consisting of pulped cellulose fibers, chemical pulps, thermomechanical pulps, bleached and unbleached paper and paper-like materials, non-woven mats, sheets, and felts.

A substrate provided as explained above is understood to require lesser amounts of polyisocyanate than prior-art methods, relative to the cellulosic material, while having important physical parameters at least as good as, if not superior to, composite substrates made using prior-art methods.

An overall object of the present invention is to provide an improved composite laminar product having a polyisocyanate impregnated substrate and an organic polymer material on at least one major exterior surface of the substrate.

The foregoing objects and other features and advantages of the present invention will be more fully understood as the detailed description thereof proceeds, particularly when considered together with the accompanying drawing.

BRIEF DESCRIPTION OF THE DRAWING

FIG. 4 is a histogram showing the effects of various amounts of propylene carbonate on the viscosity of PMDI polyisocyanate.

FIG. 7A is a plot of internal bond strength of a 3-ply polyurea-cellulose composite made with 58-lb basis-weight kraft linerboard impregnated with neat or propylene carbonate-diluted PMDI in the presence or absence of a catalyst.

FIG. 8A is a plot of tensile strength, in the machine direction, of a 3-ply polyurea-cellulose composite made with 58-lb basis-weight kraft linerboard impregnated with neat or propylene carbonate-diluted PMDI in the presence or absence of a catalyst.

FIG. 9C is a plot of modulus of elasticity, in the machine direction, of a 3-ply polyurea-cellulose composite made with 58-lb basis-weight kraft linerboard impregnated with neat or propylene carbonate-diluted PMDI in the presence or absence of a catalyst.

DETAILED DESCRIPTION OF PREFERRED EMBODIMENTS

Figure 1:
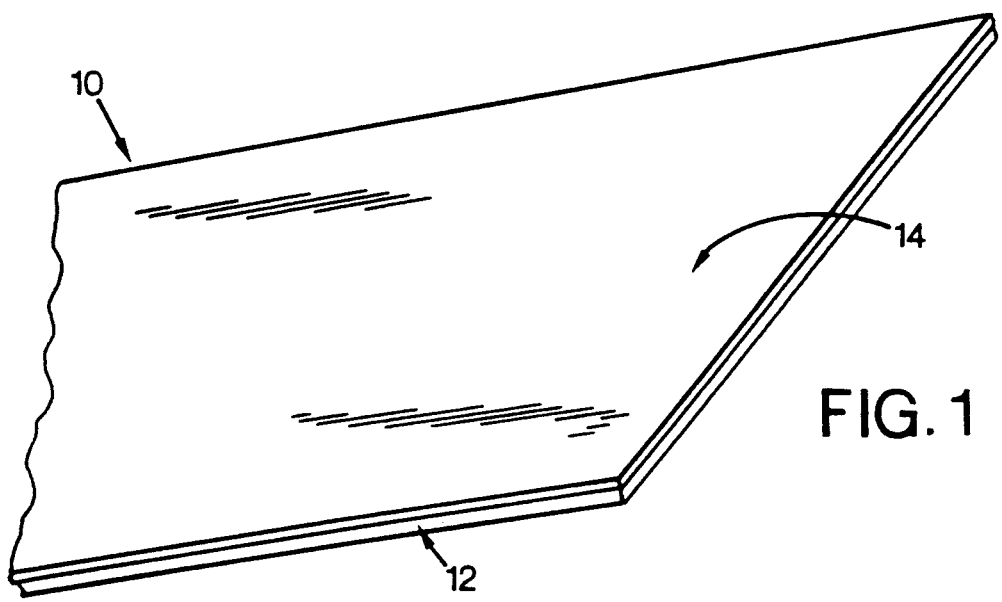
FIG. 1 is a top isometric view of a panel of the present invention with an overlay of an organic polymer material over a polyisocyanate impregnated cellulose substrate.
Figure 2:
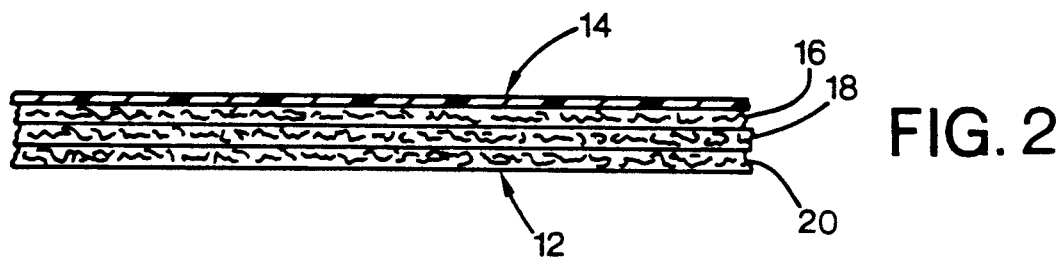
FIG. 2 is an enlarged sectional view of the panel of FIG. 1.
Figure 3:
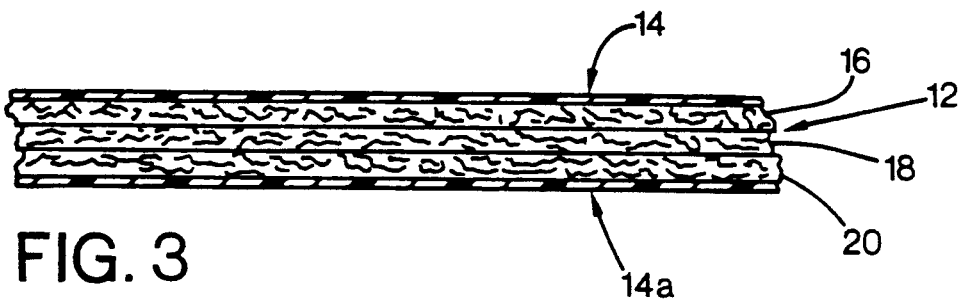
FIG. 3 is an enlarged sectional view of a panel like that of FIG. 1, except with an overlay material on both major surfaces of the panel.

As shown in FIG. 1, a panel 10 in accordance with the present invention has a polyisocyanate-impregnated cellulosic material substrate 12 shown in the shape of a sheet or panel having upper and lower major surfaces (unnumbered in FIG. 1) bounded by the edges of the panel. At least one of the major exterior surfaces of the substrate, in FIG. 1 the upper surface, is overlaid with a layer of an organic polymer material indicated at 14 in FIG. 1. Preferably, the polymer materials are of the type which cure to a very hard durable surface melamine-plastic and polyester containing materials being two specifically preferred examples. The substrate is also preferably formed of plural layers of the cellulosic material, such as the three layers 16, 18 and 20 shown in FIG. 2 which are each impregnated with the polyisocyanate resin material and cured to form the substrate. Each of the major exterior surfaces of the substrate 12 may be overlaid with the polymer material layer, such as indicated by the layers 14 and 14a in FIG. 3.

In a preferred manufacturing approach, the polyisocyanate containing substrate is first cured utilizing a combination of heat and pressure, or simply allowed to cure under ambient pressure and temperature conditions. A layer of uncured polymer material is then placed on at least one major surface of the substrate. Polymer materials are commercially available in an uncured sheet form, in which case an uncured sheet of the polymer material is simply placed on one of the major surfaces of the panel, or both major surfaces if both surfaces are to be overlaid in this manner. The polymer layer is then cured, typically by the application of heat and pressure. During the curing process, the polymer sheet material becomes bonded to the substrate. The exact bonding mechanism is unknown, however, it is believed that the polymer when heated flows into minute or microscopic voids in the substrate and mechanically engages these substrate surface formations as the polymer material is cured. Alternatively, a cured sheet of polymeric material may be adhesively or otherwise secured to a cured substrate utilizing commercially available adhesives, such as MOR-AD 434 from Morton International of Chicago, Ill. As yet another alternative manner of manufacturing the product of the present invention, both the substrate and overlay may be placed together while uncured. Simultaneously by the application of heat and pressure, these materials are cured to bond them together during the curing process. This latter approach can result in the polyisocyanate impregnated material releasing water vapor and gas during curing, which can cause blistering or bubbles between the overlay and substrate. However, techniques such as cooling the substrate in the press before relieving the pressure on the substrate would minimize these potential problems. Also, instead of utilizing the polymeric material in sheet form, the polymeric material in liquid form may be sprayed or otherwise coated onto one or both of the major surfaces of the substrate and cured. However, from a manufacturing standpoint, it is typically much more convenient to utilize the polymer material in sheet form.

The substrate may be formed in any suitable manner, such as in accordance with the teachings of U.S. Pat. No. 5,008,359 of Hunter. Other mechanisms for forming the substrate, such as is disclosed in copending U.S. patent application Ser. No. 07/752,821, entitled "Polyurea-Cellulose Composites and Method for their Manufacture" to Hunter et al., which is incorporated herein by reference, may also be used, as well as other procedures for impregnating cellulosic sheets with polyisocyanate and curing these sheets as are now known or hereinafter discovered in the art. However, the most preferred process for producing a substrate with improved properties is explained below.

SUBSTRATE PRODUCTION

The cellulosic material of the substrate comprises cellulose fibers from the group consisting of substantially delignified cellulose fibers, including pulped fibers, "chemical pulps," "thermomechanical pulps," recycled pulp fiber, bleached and unbleached paper and paper-like materials, non-woven mats, sheets or felts, and the like. The origin of the delignified cellulose can be any of a large variety of sources, including wood and various other plant fibers, such as from agricultural by-products, and also including recycled cellulose. Delignified celluloses are characterized as having had most to substantially all the indigenous lignin and analogous naturally-occurring binders removed. Delignification increases the opportunity for reaction between isocyanate groups on molecules comprising the resin and the hydroxyl groups present on cellulose molecules. Preferably, virtually all (95 percent or more) of the cellulosic material in the substrate consists of fibers from the above group, although blends of fibers may be used.

For convenience, the cellulosic material is preferably in a substantially two-dimensional or sheet form having sufficient porosity to absorb liquids. Sheets, compared to other shapes, are generally easier to impregnate with a liquid using conventional machinery. However, three-dimensional forms of cellulosic material may also be impregnated, including complex shapes. The principal limitation on shape is dictated by available machinery for controllably impregnating the cellulosic material and for subsequently curing the impregnated material in a uniform manner using heat and pressure. Ambient condition curing of the substrate is also possible.

A preferred cellulosic material is "kraft linerboard," which is a paper-like board made according to the kraft (sodium sulfate) method of papermaking. Linerboards are commonly used for the outer layers of a corrugated board used, for example, in the construction of shipping cartons. Such sheets are manufactured in a number of basis-weight grades, ranging from about 30 lb basis weight (30 lb/1000 ft$^2$) to about 90 lb basis weight (90 lb/1000 ft$^2$).

The cellulosic material preferably includes a small amount of moisture, up to about ten percent w/w relative to the mass of cellulose. Such a level of moisture is not generally detectable in a tactile sense as "wetness." Rather, water molecules comprising such moisture are tightly associated with the cellulose molecules as one or more molecular layers of water present on the cellulose fibers. Such moisture is normal with cellulosics because of the hydrophilic nature of cellulose. Hence, it is usually not necessary to add extraneous moisture. However, under extremely arid conditions, adding moisture to the cellulose fibers by, for example, application of steam, may result in improved impregnation of the resin.

The moisture will serve as a reactant, since water is known to react with isocyanates. This is supported by the fact that some residual moisture in the cellulosic material seems to improve the qualities of the substrate. Also, infrared spectral analyses of various composites made according to the present invention indicate that urethanes are formed when the resin and the cellulosic material are anhydrous at the time of curing. No urethane peaks are observed when moisture is present. The presence of moisture has also been found to yield faster curing than no moisture at all (anhydrous).

The preferred polyisocyanate compound is poly(diphenylmethane diisocyanate) (referred to herein as "PMDI"), such as PAPI-2027 available from Dow Chemical Corporation, Midland, Mich. PMDI is a partially polymerized, or "oligomerized," material. Other organic polyisocyanates are also usable, simply by virtue of such compounds possessing at least two isocyanate (—NCO) groups per molecule, which renders the molecules polyfunctional and capable of reacting to form crosslinked polymeric materials. Hence, candidate polyisocyanates include lower ($C_1$–$C_{12}$) aliphatic, alicyclic, and aromatic polyisocyanates. Polyisocyanates may be used as single compounds or mixtures of two or more different polyisocyanate compounds.

The organic solvent used as a diluent for the polyisocyanate in this specific approach must be miscible with the polyisocyanate. The resulting liquid mixture is termed herein a "resin." The preferred solvent is propylene carbonate, principally because it is substantially odorless and colorless, has low viscosity, low toxicity, low vapor pressure at room temperature, and low flammability (boiling point: 242° C.; flashpoint: 132° C.). The high boiling point of propylene carbonate is particularly advantageous because this solvent is thereby prevented from vaporizing under curing conditions of elevated temperature and pressure. Boiling during curing can cause undesirable formation of bubbles in the polyurea, resulting in a composite substrate having unacceptable appearance and physical properties. The high flash point of propylene carbonate is an important indicator of its low flammability. Other organic solvents can also be used, so long as drawbacks of those other organic solvents, such as toxicity, low boiling point, or flammability, can be accommodated. Candidate alternative solvents include, but are not limited to, aromatics such as benzene, halogenated benzenes, nitrobenzenes, alkylbenzenes such as toluene and xylenes, halogenated lower aliphatics, ethers, ketones, alkyl acetates, and other alkylene carbonates.

One benefit of diluting the polyisocyanate with an organic solvent is reduced cost, since polyisocyanates such as PMDI are relatively expensive compared to the cost of the solvent. Also, and very importantly, up to about 20% w/w solvent in the resin, relative to the polyisocyanate, confers surprisingly improved mechanical properties to the polyurea-cellulose composite substrate of the present invention, compared to similar composites made using "neat" (undiluted) polyisocyanate (see Examples). These improved properties become apparent when the amount of solvent is at least about 5%. An amount of solvent greater than about 20% w/w, while sometimes also yielding improved mechanical properties over neat polyisocyanate, can yield a composite exhibiting an unacceptably high degree of water-absorption. Hence, about 20% w/w solvent is regarded herein as a practical upper limit and about 5% w/w is regarded as a practical lower limit. A greater relative percentage of solvent (20 to 50% w/w) may be required, however, to achieve satisfactory impregnation of such cellulosics as bleached fluff pulp fiber sheets that are difficult to impregnate with a more viscous polyisocyanate resin having less solvent.

It is not entirely clear what role the organic solvent plays in conferring improved mechanical properties to the composite substrate. One possible mechanism is that addition of a low-viscosity solvent tends to reduce the viscosity of the relatively viscous polyisocyanate. Reduced viscosity appears to yield improved penetration of the resin into the physical matrix presented by the cellulosic material (see Example 2). The solvent may also confer benefits due to solvation effects which, in turn, enhance the reactivity of the polyisocyanate with cellulose molecules. For example, solvation may result in improved "wetting" of cellulose fibers by the polyisocyanate, or may lower the energy of reaction between polyisocyanate and cellulose molecules, thereby allowing more bonding reactions per unit volume to occur between polyisocyanate and cellulose at a given temperature and pressure. Solvation may also facilitate reaction of the polyisocyanate with residual water molecules. It is likely that more than one of these effects of adding solvent are responsible for the improved mechanical properties of the composite.

Propylene carbonate may serve as a copolymerizable reactant with the polyisocyanate to some limited extent. This solvent has been reported to react in the presence of a catalyst with organic polyisocyanates to form isocyanurates under certain conditions. See Tzuzuki et al., "New Reactions of Organic Isocyanates. I. Reaction with Alkylene Carbonates," *J. Org. Chem.* 25:1009 (1960). Absence of such copolymerization reactions with PMDI in the present instance is indicated by the absence in the composite substrate of an isocyanurate IR absorption spectral pattern. Other solvents, however, may react with polyisocyanate.

To prepare the resin, it is merely necessary to add the requisite amount of organic solvent to the corresponding amount of polyisocyanate, within the range of about 5% to about 20% w/w solvent relative to the mass of the polyisocyanate. Combining the polyisocyanate and the solvent can be performed by a batch or continuous process using equipment generally known in the art.

The resin is preferably prepared and cured without an added catalyst, although a catalyst can be added without departing from the principles of the present invention. As is known in the art, a catalyst enhances a chemical reaction generally by lowering the reaction energy barrier. Presence of a catalyst can cause problems because a catalyst can cause "pre-cure" of the resin, which is a too-rapid onset of the polymerization reaction characterized by excessive polyurea formation after impregnating the cellulosic material but before heat and pressure is deliberately applied for curing. Pre-cure can cause inconsistent product quality and/or general degradation of physical parameters such as internal bond strength compared to composite substrates made without a catalyst. Hence, use of a catalyst can make the overall process difficult to control. However, if pre-cure can be controlled or at least limited, composite substrates having acceptable industrial properties can be produced according to the present invention.

If used, the catalyst can be selected from a variety of catalysts used for isocyanate polymerizations. The amount of catalyst is preferably within the range of 0.1 to 0.5% w/w, relative to the mass of the resin. Possible catalysts include aliphatic tertiary amines such as 1,4-diazobicyclo-(2,2,2)-octane ("DABCO"), aliphatic metal complexes such as dibutyltin dilaurate or tin octoate, and acetyl acetonates.

The liquid resin is applied to the cellulosic material in any manner whereby satisfactory impregnation of the cellulose fibers by the resin can be achieved. Typical loading levels are within the range of about 8 to about 20% resin relative to the mass of the cellulose, which yields composite substrates exhibiting excellent end-use properties at reasonable manufacturing cost. In the usual case where the cellulosic material is in sheet form, the resin can be applied on one or both sides of each sheet by spraying, dipping, rolling, or other suitable process known in the art.

The cellulosic material can be impregnated via either a batch or continuous process, each employing different types of machinery. A continuous process is especially suitable when the cellulosic material is provided in the form of a continuous roll, such as with various papers and linerboard stock. For continuous impregnation, a two-roller applicator (size press) is an effective means for applying resin to the cellulosic material, wherein the cellulosic material is fed through a continuous bead of resin lying in the nip zone of two press rollers which force the resin into the fiber matrix of the cellulosic material. Other effective means for applying the resin to the cellulosic material include a gravure roll-coater and a dip-bath containing the resin through which the cellulosic material is passed.

Using sheetlike or matlike cellulosics as examples, the resin can be applied to either the wire side or the felt side of the sheet, or to both sides. In any event, it is important that the resin be applied in a manner that will ensure full and substantially uniform penetration of the resin throughout the "Z" or thickness dimension of the sheet.

Satisfactory resin-impregnation of kraft linerboard sheets results in a resin loading of about 10–20% w/w relative to the mass of the linerboard. In fact, the resin loading of 58- and 69-lb linerboards is consistently about 15–16% when applied using a gravure roll-coater apparatus known in the art. Resin-loading values either greater or less than the 10–20% range may result when other types of cellulosic material are impregnated, depending on a number of factors including porosity, density, fiber geometry, thickness, rigidity, and hydrophilicity of the cellulosic material, as well as the type of resin-impregnation machinery used. Gravure roll-coaters work well for linerboards and other paper-like cellulosic materials.

Once the cellulosic material has been impregnated with the polyisocyanate resin, the impregnated sheet is cured by simultaneous application of heat and pressure for a time not exceeding about five minutes. The curing temperature can be within the range of about 105° to about 245° C.; and the pressure within the range of about 130 to about 1200 psig. Shorter times are generally used when making thinner composite substrates. The cited ranges of temperature and pressure are sufficient to effect polymerization of the polyisocyanate to form polyurea.

Since heat and pressure are typically used to initiate curing, impregnated cellulosic material can be stored for short periods of time, up to several days, before curing. Short-term storage may therefore be at about room temperature. Storage more preferably, especially for long-term storage, is at below room temperature conditions (e.g. at 0° C.). Curing can take place at ambient conditions of temperature and pressure, albeit more slowly.

The polyurea-cellulose composite substrate used in the present invention can be made having only one ply produced by curing only a single lamina of polyisocyanate-impregnated cellulosic material. The polyurea-cellulose composite can also be made having multiple plies, produced by curing a laminarly stacked arrangement of polyisocyanate-impregnated cellulosic material. Such multiple-ply composites generally are thicker and more rigid than single plies.

Curing can be performed as either a continuous or as a batch process. Platen presses known in the art are generally used for curing batch-cured flat sheet-like composite substrates. A possible disadvantage with using such presses is the requirement for extreme flatness and parallel orientation of the caul plates. Misoriented or non-flat plates can result in composites having non-uniform properties. Nevertheless, caul-plate presses are often used to make sheet products measuring 4×8 or 4×4 feet. Continuous presses, on the other hand, are generally able to produce the same degree of curing using lower curing pressures than caul-plate presses. Also, continuous presses allow long sheets of product to be made having substantially uniform properties.

The following Examples are provided to illustrate the production of the substrates but are not to be construed as limiting the invention in any way.

EXAMPLE 1

In this Example, the effect on viscosity of adding particular amounts of propylene carbonate to PMDI was investigated. Propylene carbonate was added to PMDI at a concentration of 1%, 5%, 10%, and 15% w/w relative to the PMDI. The control was neat (undiluted) PMDI. After adding the polypropylene carbonate, the viscosity of each resin mixture was determined at 22.5° C. FIG. 4 is a histogram of the results, showing that, for example, the viscosity of a PMDI resin containing 15% propylene carbonate was less than half that of neat PMDI or of a resin containing only 1% propylene carbonate.

EXAMPLE 2

In this Example, a qualitative investigation was made of the degree of penetration into kraft linerboards of either neat or diluted PMDI resin. Single kraft linerboard sheets having 58-lb basis weight and about 5-7% moisture content were impregnated with PMDI, either in neat form or diluted with 5, 10, or 15% w/w propylene carbonate. The PMDI resin was applied to the linerboard using a two-roll applicator (size press). The linerboard was fed through the bead and between the rollers such that the resin was applied simultaneously to both surfaces (wire and felt sides) of the linerboard. The amount of resin impregnated into the linerboard was governed in part by the rotational velocity of the rollers and the pressure (clearance) between the rollers.

The resin-impregnated sheets were cured by oven heating at 177° C. for 3–4 hours without pressurization. After cooling, the sheets of polyurea-cellulose composite were cross-sectioned and the sections examined under the light microscope.

Figure 5A:
FIG. 5A is a sectional view of a polyurea-cellulose composite substrate made by impregnating a kraft linerboard with neat PMDI; felt side is on top, wire side on bottom; 60× magnification.

FIG. 5A shows a cross-sectional view depicting the "Z" or thickness dimension of a single-ply composite sheet made using neat PMDI. The core (or center) portion of the linerboard has a lower amount of polyurea than the outer portions near the surfaces. This result indicates that, as neat PMDI is applied to the surfaces of the linerboard, penetration of the PMDI to the linerboard core is limited, due in part to the relatively high viscosity of neat PMDI. As a result, most of the PMDI remains near the surfaces of the linerboard.

Figure 5B:
FIG. 5B is a sectional view as in FIG. 5A, but where the PMDI was diluted by adding 5% w/w propylene carbonate, relative to the PMDI.

FIG. 5B shows a sheet of polyurea-cellulose composite made using PMDI diluted with 5% propylene carbonate. The resin has penetrated more deeply through the Z dimension of the linerboard. As a result, the core portion of the linerboard has a greater amount of polyurea than the core portion of the linerboard of FIG. 5A. However, FIG. 5B shows that a greater amount of polyurea is still present in the outer portions of the linerboard than in the core.

Figure 5C:
FIG. 5C is a sectional view as in FIG. 5A, but where the PMDI was diluted by adding 10% w/w propylene carbonate, relative to the PMDI.
Figure 5D:
FIG. 5D is a sectional view as in FIG. 5A, but where the PMDI was diluted by adding 15% w/w propylene carbonate, relative to the PMDI.

In FIGS. 5C and 5D, showing single-ply polyurea-cellulose composite sheets made using PMDI diluted with 10% and 15% propylene carbonate, respectively, an apparently uniform distribution of polyurea is present throughout the Z dimension of the linerboard.

Therefore, the results shown in FIGS. 5A-5D indicate that, in order to ensure a substantially uniform distribution of polyurea throughout the Z dimension of linerboards, PMDI should be diluted with at least 10% w/w propylene carbonate or similar solvent. Uniform impregnation of other types of cellulosic material may require more or less solvent in the resin.

EXAMPLE 3

In this Example, the distribution of a PMDI resin through the Z dimension of kraft linerboard was quantitatively investigated. PMDI was applied to kraft linerboard sheets (58-lb basis weight; 5-7% w/w residual moisture content) using one of two methods. In the first method, PMDI was applied by dipping single sheets of the linerboard in a solution of 13% w/w PMDI in acetone until the linerboards were saturated (12-14% w/w resin loading). The saturated sheets were then hung vertically for a sufficient time to allow the solvent to evaporate. In the second method, neat PMDI was applied to either the wire side, the felt side, or both sides of single plies of kraft linerboards. The neat resin was applied using a two-roller coater where the linerboard was passed through a bead of the liquid resin situated on either one or both sides of the linerboard as it is passed between the rollers. In one instance, all the resin was applied to the wire side of the linerboard; in another instance, all the resin was applied to the felt side; in yet another instance, the resin was simultaneously applied to both sides of the linerboard. Resin-impregnated sheets were cured by oven heating at 177° C. for 3–4 hours without application of external pressure.

After curing, two-thirds of the thickness of each sheet were carefully ground away, leaving only a one-third thickness section representing the wire side, the felt side, or the center (core) of the polyurea-cellulose composite sheet. Since cured PMDI is a polyurea which includes nitrogen atoms integrated into the polymer matrix, each ground section was analyzed for nitrogen content using the Kjeldahl method, the results of which yielded a useful quantitative measure of the relative amount of polyurea therein and, therefore, the degree of penetration of the resin into the linerboard.

Briefly, to perform the Kjeldahl procedure, portions of each section were cut to pieces weighing about 2 grams each and carefully weighed to ±0.1 g. Each piece was transferred to a 500 mL Kjeldahl flask. Additional flasks were prepared for reference samples and controls. To each flask were added 15.0 g $K_2SO_4$ and about 5 boiling chips, then 30 mL of a digest mixture (6.00 g $SeO_2$ in 24 mL ammonia-free water, plus 1800 mL of concentrated $H_2SO_4$). Each flask was mounted on a cool Kjeldahl digestion apparatus. The heating controls on the apparatus were turned on low and digestion allowed to proceed until the contents of the flask became fully liquid. Temperature was then increased to boiling which was allowed to continue until the solution became clear, then continued for an additional 20 minutes. After allowing the flask to cool, 50 mL ammonia-free water was slowly added while swirling the flask, using the water to wash down debris on the inside walls of the flask and dissolving any salt sediment. The liquid was transferred to a 250-mL volumetric flask, which was filled to volume with cool liquid from three additional rinsings of the Kjeldahl flask using ammonia-free water. A 5.00 mL aliquot of the liquid in the volumetric flask was added to a 100-mL mixing cylinder. The aliquot was diluted to about 90 mL with ammonia-free distilled water, then 3 mL of 20% NaOH was added and the resulting solution brought to volume by adding additional water. The contents of the cylinder were transferred to a 150 mL beaker containing a stirring bar. With stirring, ammonia concentration was determined using an ammonia electrode at steady state both before and after adding 10 mL of 20.0 mg/L $NH_4$-N standard solution.

Figure 6:
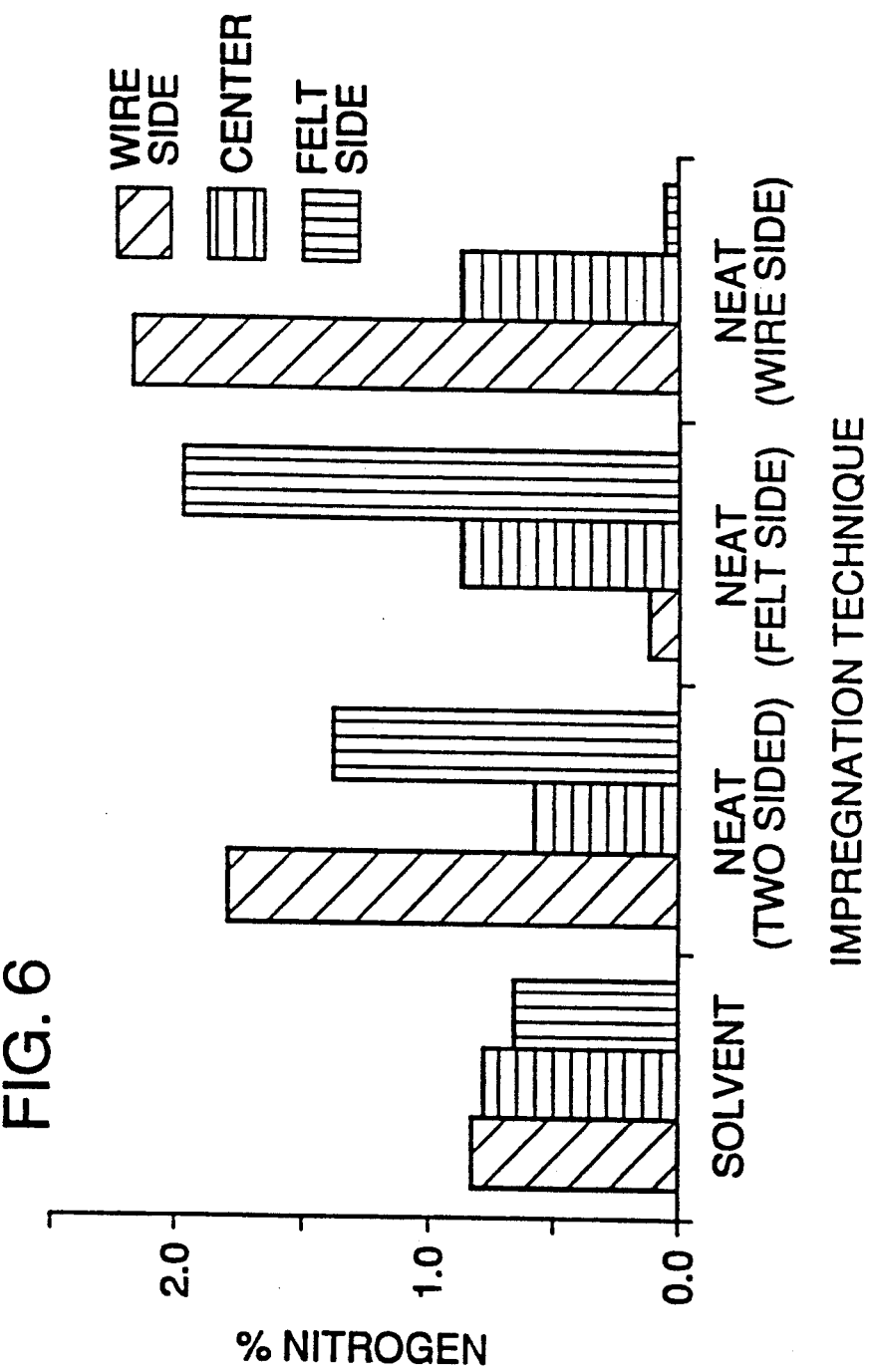
FIG. 6 is a histogram showing the distribution of polyurea (as % nitrogen) through the "Z" or thickness dimension of a polyurea-cellulose composite when PMDI, in either neat form or dissolved in acetone (13% w/w), was applied on one or both sides of a kraft linerboard.

FIG. 6 shows that 13% w/w of PMDI in acetone results in a desired substantially uniform distribution of the resin throughout the wire side, the felt side, and the core of the linerboard when the resin is applied simultaneously to both sides of the linerboard. Application of neat PMDI simultaneously to both sides of the linerboard resulted in substantially less polyurea in the core and relatively more polyurea in the felt and wire sides of the linerboard. Application of neat PMDI to only the felt side resulted in a very low relative amount of polyurea on the wire side; likewise, application of neat PMDI to only the wire side resulted in a very low relative amount of polyurea on the felt side. It is possible that other types of coaters would produce somewhat different results.

EXAMPLE 4

In this Example, the internal bond strengths of 3-ply polyurea-cellulose composite sheets made using either 58-pound or 69-pound kraft linerboards were evaluated. Each linerboard was impregnated with a loading level of about 16% w/w PMDI resin in either neat form or diluted with 2, 10, or 20% w/w propylene carbonate in the presence or absence of a catalyst. When present, the catalyst was diazobicyclooctane (DABCO), prepared as a 0.05% solution in acetone, with which solution the linerboards were first impregnated, then dried, then subsequently impregnated with the PMDI resin. After impregnation, three linerboards were plied and cured by heating to 204° C. and pressurizing momentarily at 400 psi, opening momentarily to atmospheric pressure, then pressurizing at 800 psig for 40 seconds at the same temperature. If no catalyst was used, the linerboards were impregnated with the PMDI resin, then cured.

Eighteen samples of 3-ply polyurea-cellulose composite sheets were prepared for testing purposes from each combination of linerboard basis weight percent of propylene carbonate, and presence or absence of a catalyst. Testing was performed according to ASTM test specification number D1037-89, paragraphs 28.1-33. Each sample was cut to a square shape having 2-inch sides. Each square surface was cemented to an identically-sized surface of a steel block using cyanoacrylate or epoxy cement. After the cement cured, each block was grasped in an opposing coaxial jaw of an Instron device adjusted to apply a force tending to pull the blocks away from each other. The force at which each sample pulled apart was recorded.

Figure 7B:
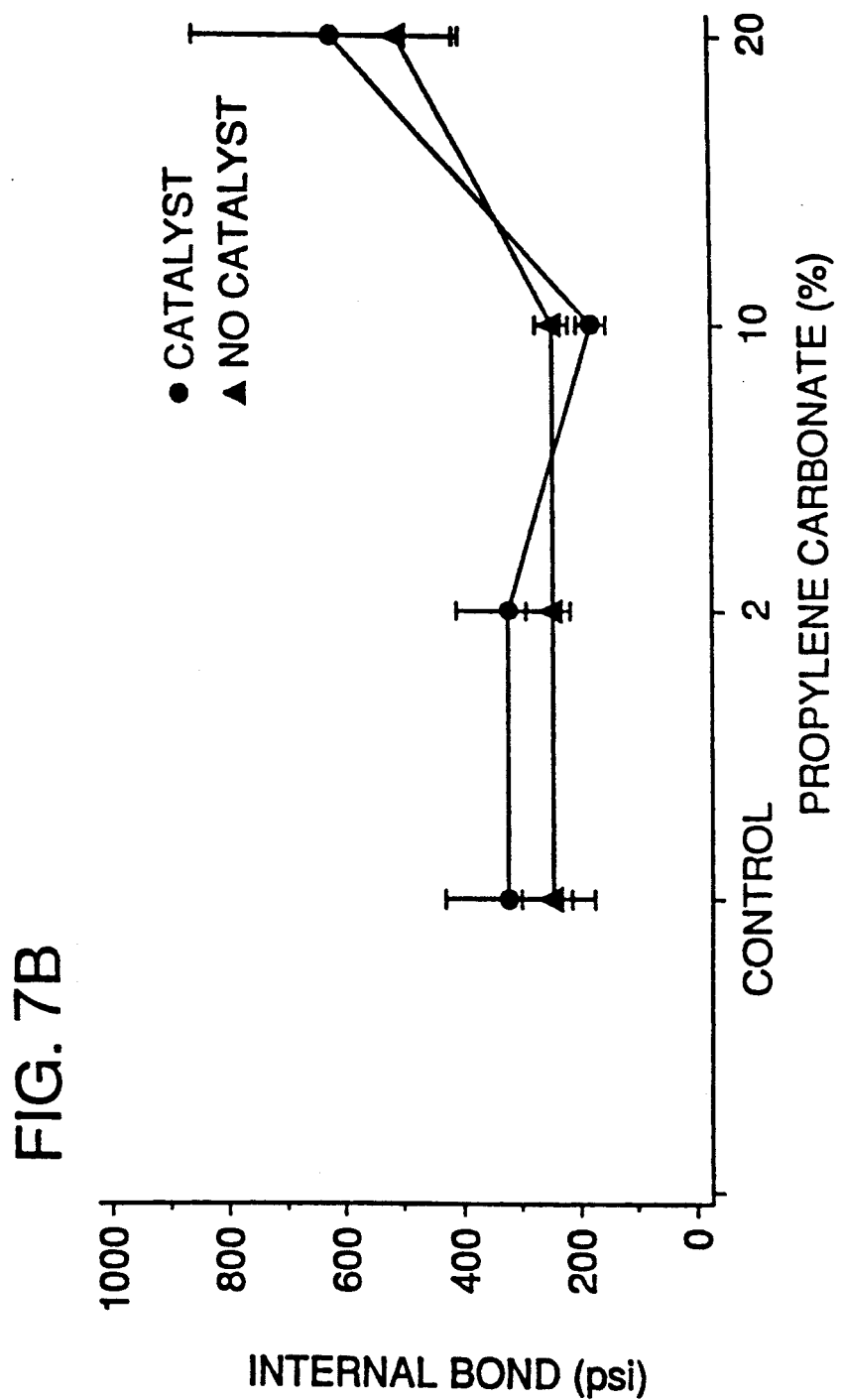
FIG. 7B is a plot similar to FIG. 7A except that the kraft linerboard was 69-lb basis weight.

Test results are shown in FIGS. 7A and 7B, where the data points represent sample means (n=18) and the brackets represent ±one standard deviation from the corresponding mean. In FIG. 7A, internal bond values for the combination of uncatalyzed resin and 58-lb linerboard increased with increasing content of propylene carbonate, from about 530 psi with neat PMDI to about 1150 psi with 20% propylene carbonate. With catalyzed resin, addition of propylene carbonate yielded an increase in internal bond strength, but the magnitude of the increase over neat PMDI was not as pronounced as with no catalyst. Nevertheless, the magnitude of the increase in internal bond strength from 2% to 20% propylene carbonate was about the same for both catalyzed and uncatalyzed resin.

FIG. 7B shows internal bond data for polymer cellulose made using 69-lb basis weight linerboard and uncatalyzed resin. Again, addition of propylene carbonate to the PMDI resin yielded a general increase in internal bond strength, where the strength obtained using 20% propylene carbonate was about double the strength obtained using neat PMDI.

EXAMPLE 5

In this Example, evaluations were made of the tensile strengths of various polyurea-cellulose composite sheets made using either neat PMDI or PMDI diluted with up to 20% w/w propylene carbonate, either with or without a catalyst (DABCO). Three-ply composite sheets were made using either 58-lb or 69-lb basis weight kraft linerboards. Eighteen samples were prepared for each combination of basis weight, percent dilution, and presence or absence of catalyst, essentially as described in Example 4. After curing, the samples were each cut to the "dogbone" shape appropriate for tensile testing. Tensile testing was performed in the "machine direction" (MD) using an Instron device according to ASTM test specification number D638-89.

As used herein, the "machine direction" or "MD" refers to the net orientation of cellulose fibers in a sheet of cellulosic material such as paper. For example, when paper is made using conventional roller machinery, the cellulose fibers tend to become longitudinally oriented in a direction substantially parallel to the direction of movement of the paper through the roller apparatus. The finished paper tends to show less resistance against a tensile force applied perpendicularly to the machine direction (i.e., in the "cross direction" or "CD") compared to tearing forces applied in the machine direction.

Figure 8B:
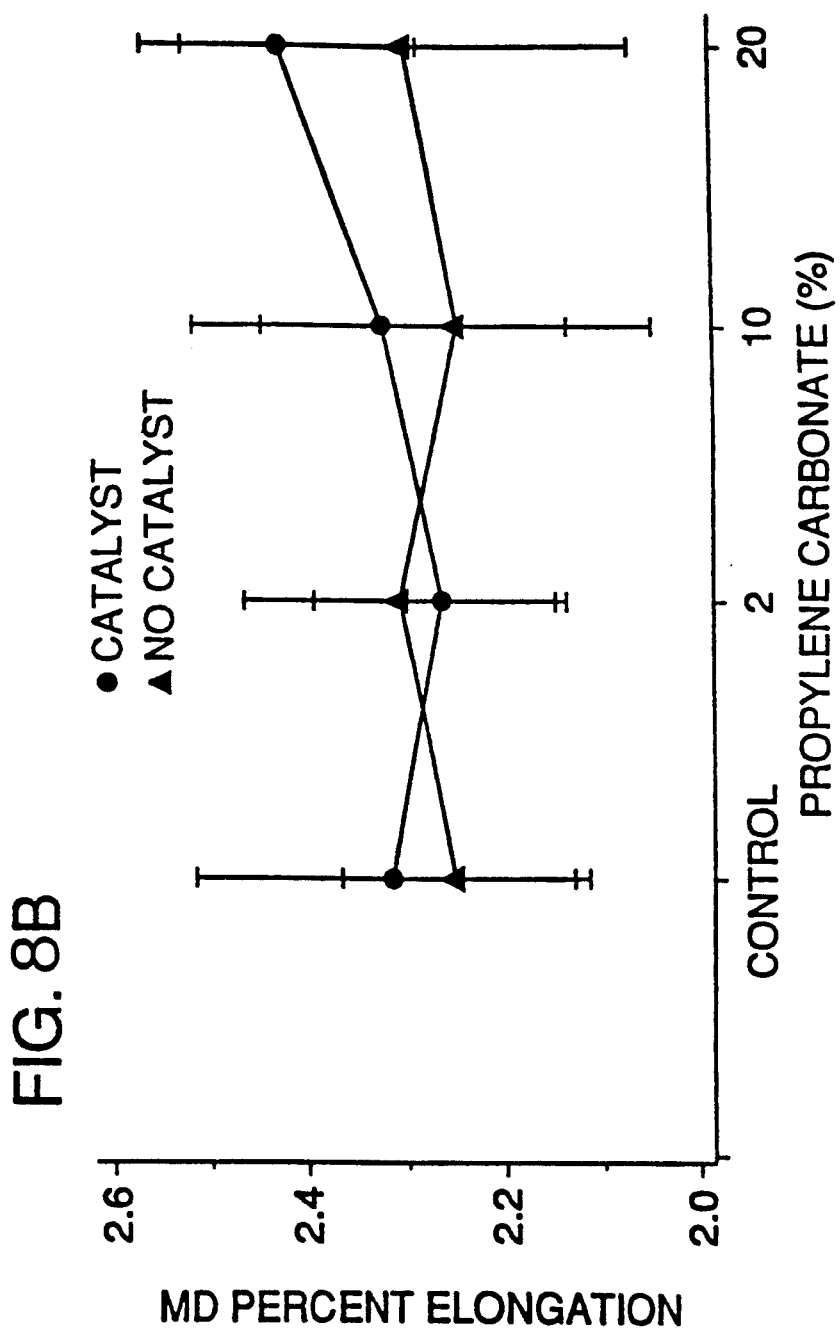
FIG. 8B is a plot similar to FIG. 8A, but showing percent elongation of the composite at time of fracture during the tensile testing shown in FIG. 8A.
Figure 8C:
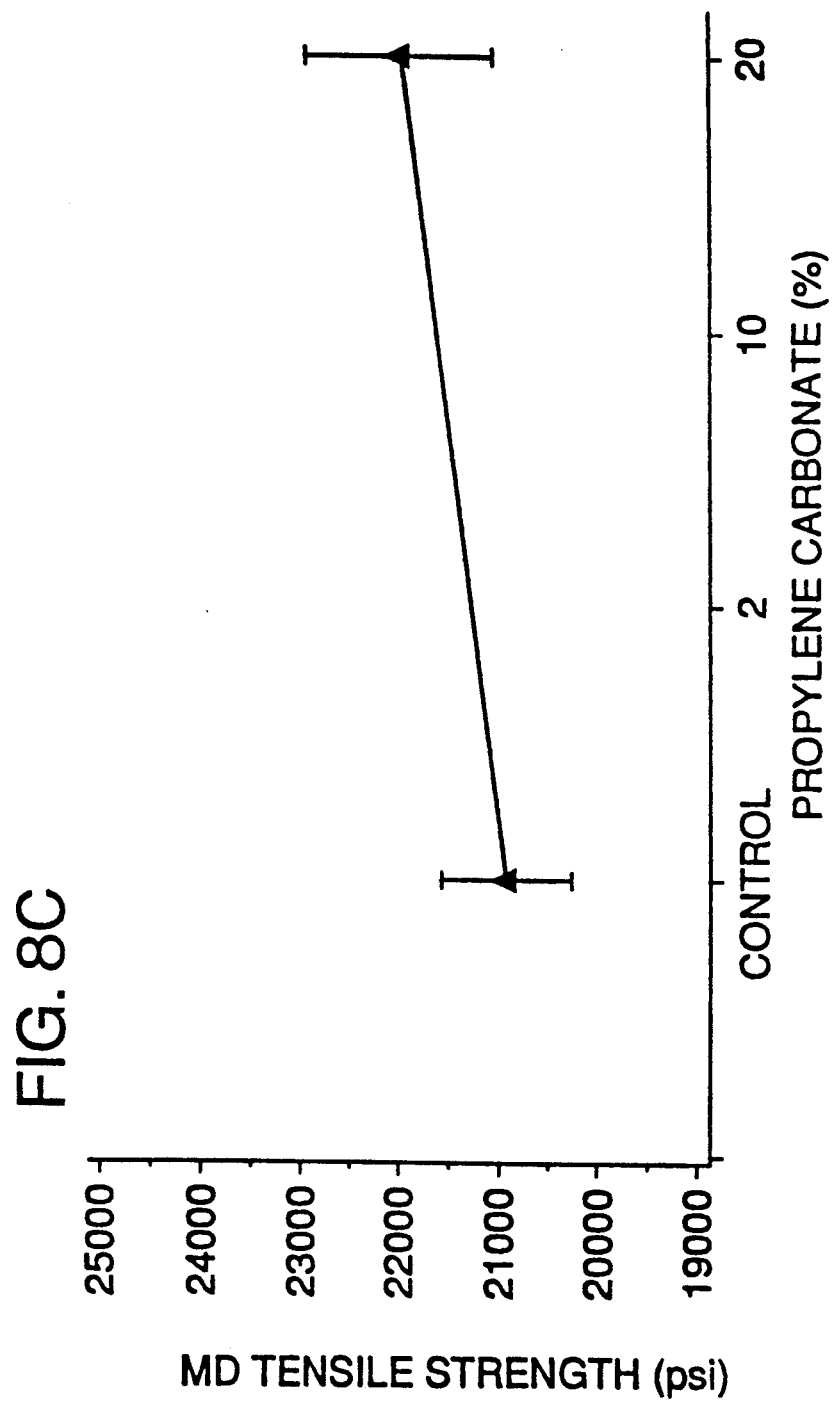
FIG. 8C is a plot similar to FIG. 8A except that the kraft linerboard was 69-lb basis weight and no catalyst was used.
Figure 8D:
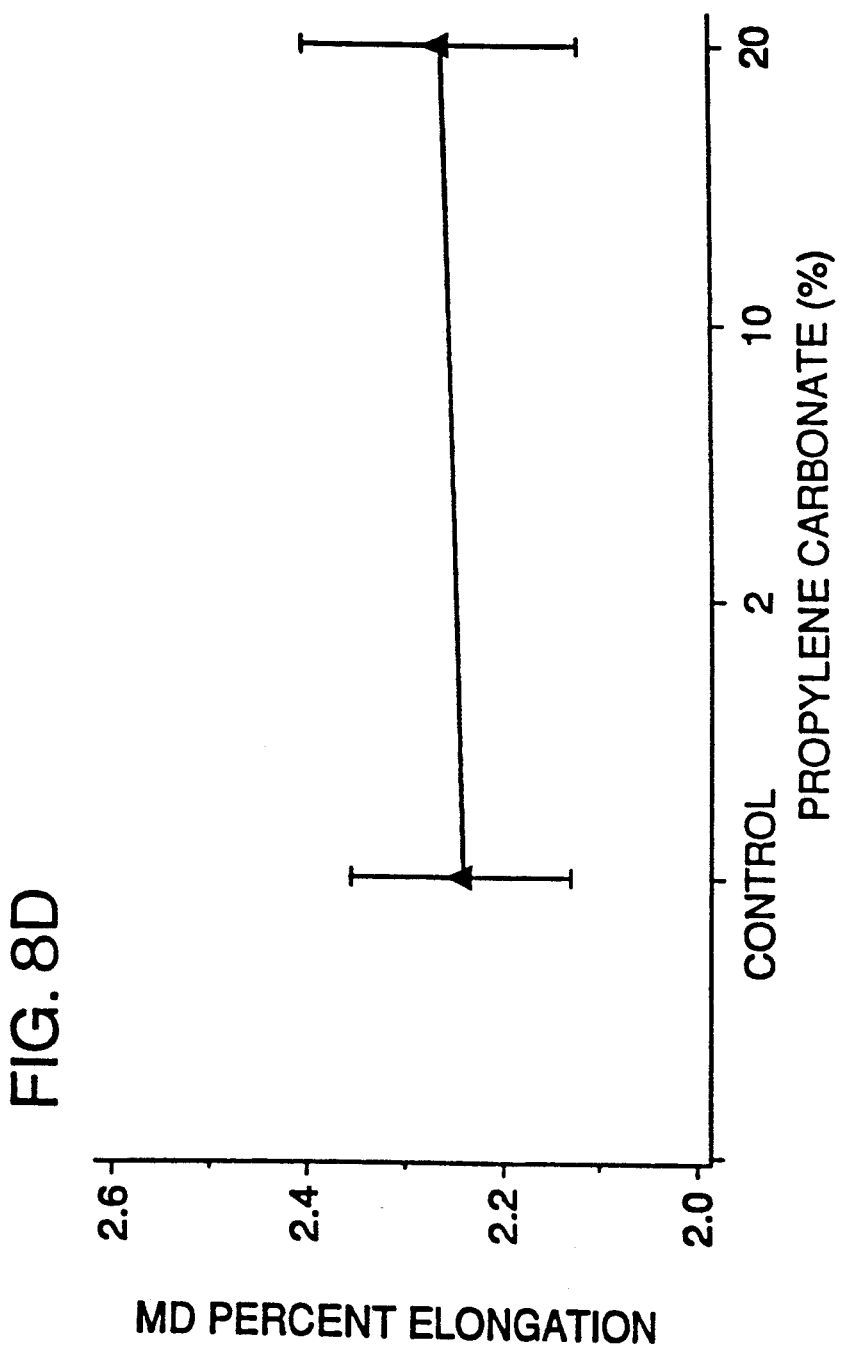
FIG. 8D is a plot similar to FIG. 8B except that the kraft linerboard was 69-lb basis weight and no catalyst was used.

Test data are plotted in FIGS. 8A and 8B, pertaining to 58-lb linerboard, and in FIGS. 8C and 8D, pertaining to 69-lb linerboard. Data points represent sample means (n=18) and brackets represent ±one standard deviation from the corresponding mean.

In FIG. 8A, dilution of catalyzed PMDI with up to 20% propylene carbonate caused an almost negligible decrease in tensile strength of the composite, as measured in the machine direction. Uncatalyzed PMDI generally yielded composite sheets having higher tensile strength values than sheets made with catalyzed PMDI. Nevertheless, the tensile strength of sheets made using PMDI with 20% propylene carbonate is within 5% of the tensile strength of sheets made using neat PMDI.

FIG. 8B shows data pertaining to the percent elongation experienced by the samples of FIG. 8A during tensile testing between a no-load condition and just before undergoing tensile fracture. Such data is useful as an indication of product brittleness. Almost all samples, whether catalyzed or not, experienced a percent elongation between about 2.2 and 2.4% before breaking.

FIG. 8C shows data similar to the uncatalyzed data shown in FIG. 8A but obtained using composite substrate sheets made with 69-lb basis weight linerboards. As can be seen, dilution of uncatalyzed PMDI with 20% w/w propylene carbonate yielded an increase in tensile strength over neat PMDI.

FIG. 8D shows data similar to the uncatalyzed data shown in FIG. 8B but obtained using composite substrate sheets made with 69-lb basis weight linerboards. Dilution of uncatalyzed PMDI seemed to result in no apparent change in percent elongation of the composite sheets during tensile testing.

EXAMPLE 6

In this Example, an evaluation was made of the effect on modulus of rupture and modulus of elasticity of polyurea-cellulose composite sheets made using either neat PMDI or PMDI diluted with up to 20% w/w propylene carbonate, either with or without a catalyst (DABCO). The samples were prepared as described above in Example 5.

Modulus of rupture tests were performed according to ASTM test specification number D790-86 ("flexural strength"). Modulus of elasticity tests were performed according to the same test specification.

Figure 9A:
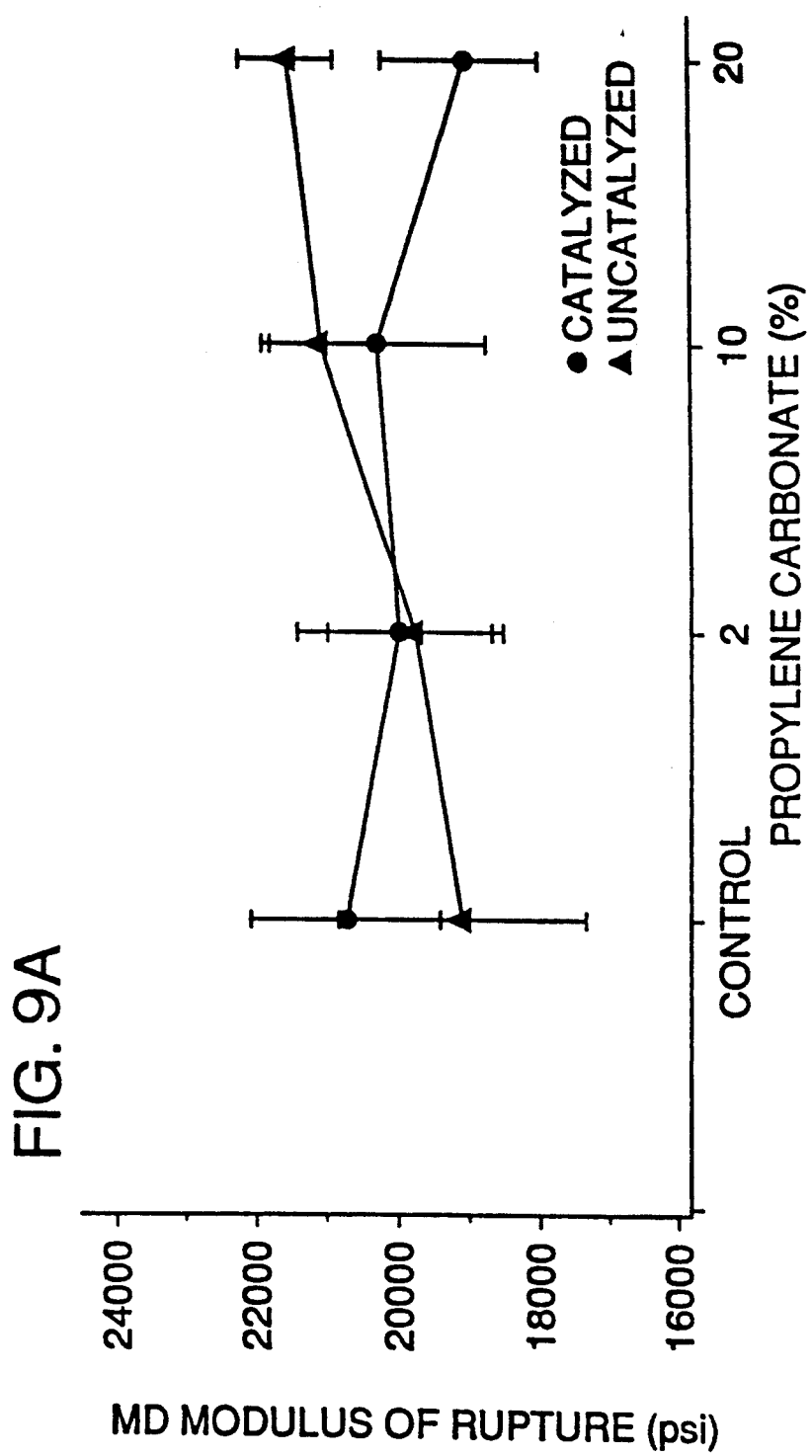
FIG. 9A is a plot of modulus of rupture, in the machine direction, of a 3-ply polyurea-cellulose composite made with 58-lb basis-weight kraft linerboard impregnated with neat or propylene carbonate-diluted PMDI in the presence or absence of a catalyst.
Figure 9B:
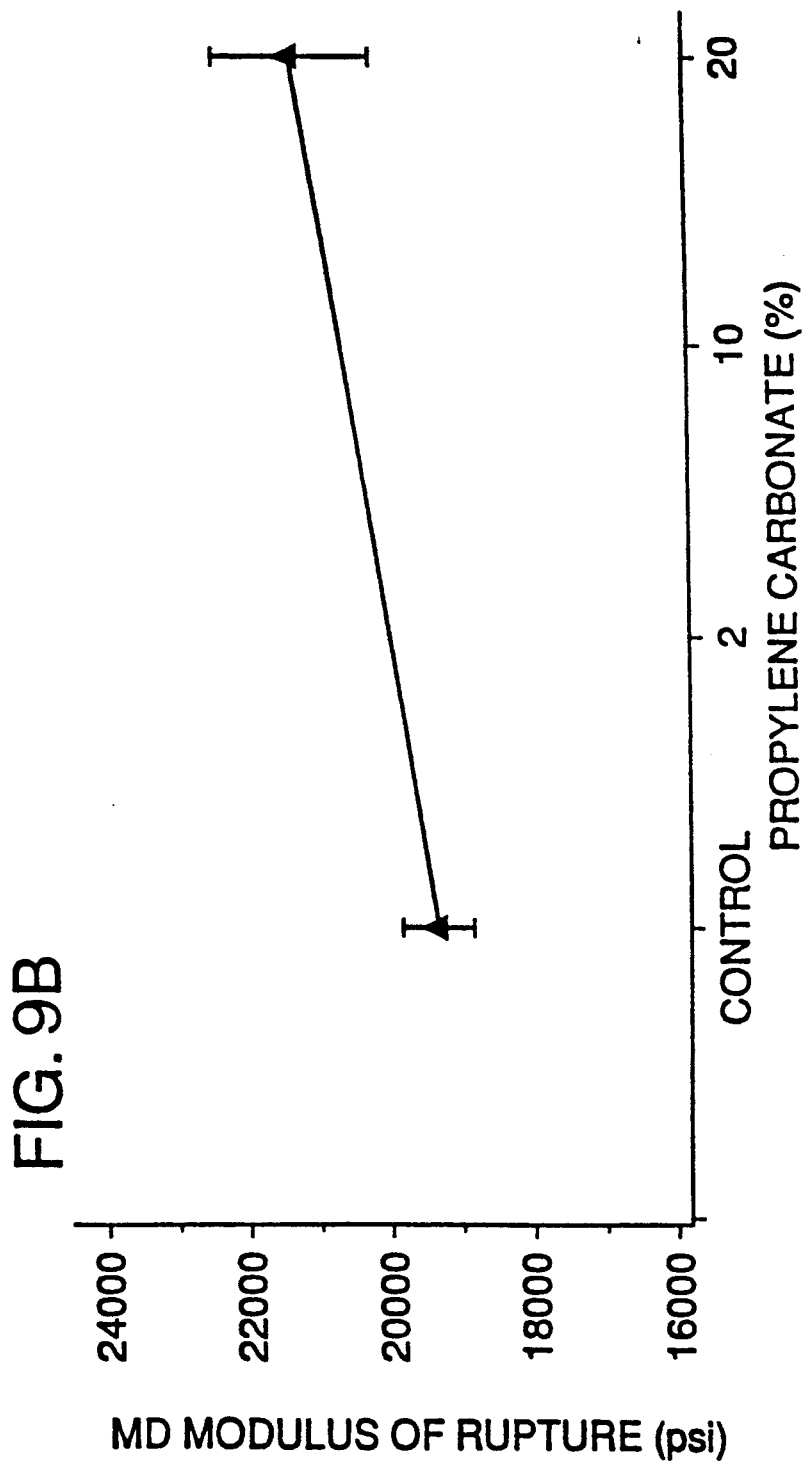
FIG. 9B is a plot similar to FIG. 9A except that the kraft linerboard is 69-lb basis weight and no catalyst was used.
Figure 9D:
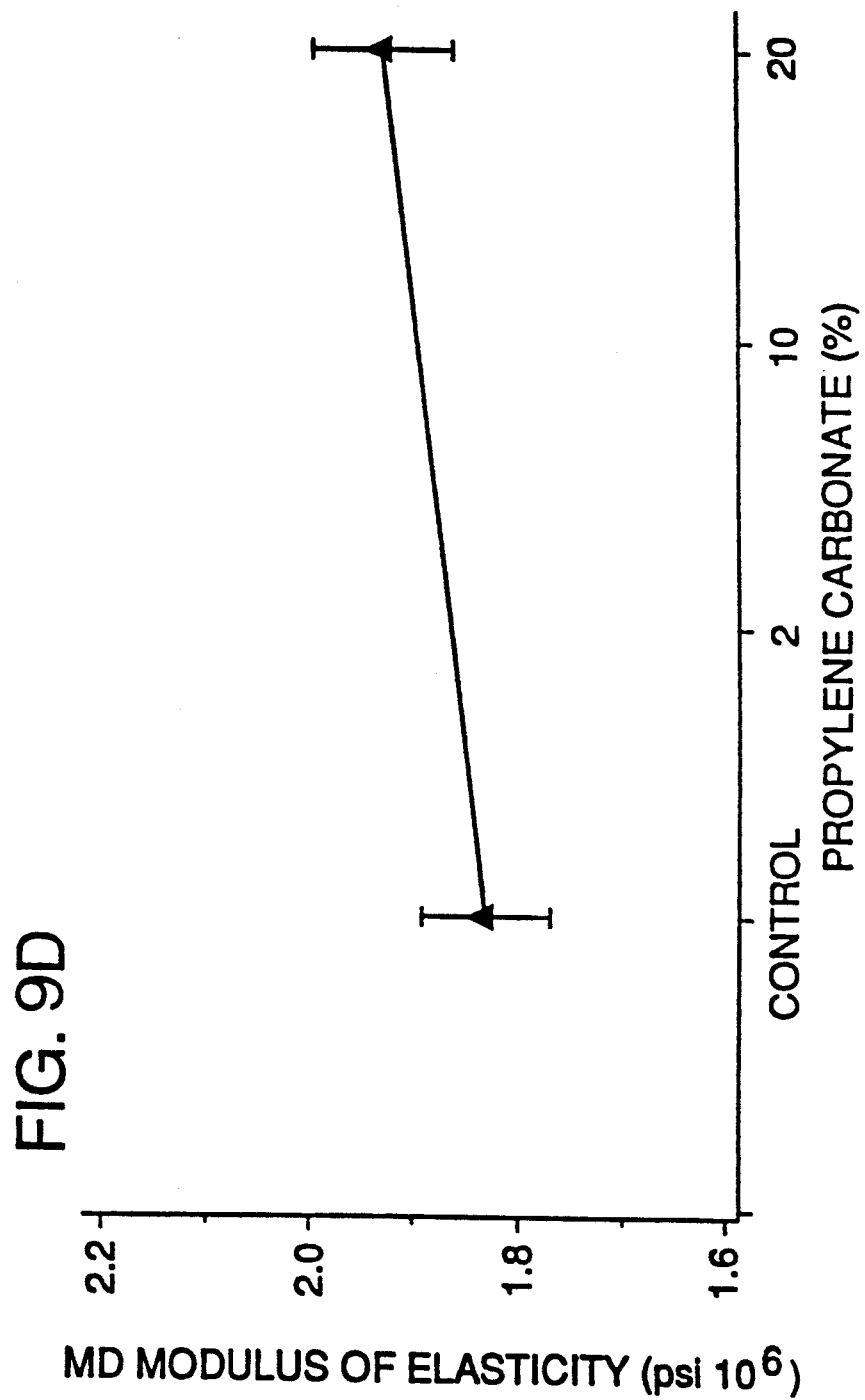
FIG. 9D is a plot similar to FIG. 9A except that the kraft linerboard is 69-lb basis weight and no catalyst was used.

Test data pertaining to modulus of rupture are shown in FIGS. 9A and 9B; test data pertaining to modulus of elasticity are shown in FIGS. 9C and 9D. Data points represent sample means (n=18) and brackets represent ±one standard deviation from the corresponding mean.

In FIG. 9A, showing data obtained with polyurea-cellulose composite sheets made using 58-lb basis weight linerboards, increasing dilution of uncatalyzed PMDI resin with up to 20% w/w propylene carbonate resulted in an increase in the modulus of rupture, from about 19000 psi from composite made using neat PMDI to greater than 21000 psi from composite made using PMDI containing 20% w/w propylene carbonate. Similar dilution of catalyzed PMDI, in contrast, yielded a corresponding decrease in modulus of rupture. The general increase in modulus of rupture upon diluting uncatalyzed PMDI is also evident in FIG. 9B, showing data obtained with composite made using 69-lb basis weight linerboards. Comparison of the uncatalyzed data of FIGS. 9A and 9B indicates that the modulus of rupture is dictated by the characteristics of the PMDI resin and not by the basis weight of the linerboard.

The data pertaining to modulus of elasticity shown in FIGS. 9C and 9D show trends similar to those of FIGS. 9A and 9B. Up to a 20% w/w dilution of uncatalyzed PMDI resin with propylene carbonate, compared with neat uncatalyzed PMDI, resulted in an increase in the modulus of elasticity. Dilution of catalyzed PMDI, in contrast, resulted in a corresponding decrease in the modulus of elasticity. Again, these parameters seemed to depend more on the characteristic of the PMDI resin (diluted versus undiluted; catalyzed versus uncatalyzed) rather than the basis weight of the linerboard.

EXAMPLE 7

In this Example, several types of catalysts were evaluated, including a tertiary amine (DABCO, Aldrich Chemical Co.) and dibutyltin dilaurate (Air Products T-12), when used with PMDI. Both are frequently used in the art when making polyurethane. With respect to the dibutyltin dilaurate, an impregnating resin was prepared by mixing together propylene carbonate (Texaco; 10% w/w based on mass of PMDI), dibutyltin dilaurate (0.05% w/w based on mass of PMDI), and PMDI (Dow Chemical PAPI 2027). Unbleached linerboards having 58 lb basis weight were impregnated with this resin using a roller applicator. Resin loading was 14% w/w relative to the mass of the linerboard.

Three-ply composite panels were made curing 3-ply stacks of impregnated linerboards at 204° C. and the following pressurization sequence:

| | |
|---|---|
| close to 400 psig | 12 sec |
| hold at 400 psig | 2 sec |
| open to atmospheric | 8 sec |
| close to 800 psig | 10 sec |
| hold at 800 psig | 30 sec |
| open to atmospheric | 6 sec |

When the first open to atmosphere was maintained for only 6 seconds, a number of panels acquired "blows" (bubbling), rendering them untestable.

With respect to the DABCO, a first set of composite panels was produced by the following procedure: 1 gram DABCO was dissolved in 20 g propylene carbonate, to which was added PMDI to 200 grams. A white precipitate formed. After stirring of the resin, unbleached 58-lb linerboard was impregnated with the resin. Three-ply composite panels were made using the same procedure as described above for the dibutyltin dilaurate-containing resin. The panels lacked adequate interply bonding and were untestable, apparently because pre-cure occurred. When the curing temperature was lowered to 149° C. with the pressurizing profile left unchanged, interply adhesion improved, yielding a second set of panels that were testable.

A third set of panels was produced by first impregnating 58-lb unbleached linerboards with a 0.5% w/w solution of DABCO in acetone, then allowing to dry overnight. The DABCO-containing linerboards were then impregnated with a resin comprising PMDI and 10% w/w propylene carbonate using a roller applicator. Resin loading was 26% w/w relative to the mass of the dry DABCO-impregnated linerboard.

Three-ply composite panels were made by curing 3-ply stacks of impregnated linerboards at 204° C. and a pressurization sequence similar to that for the dibutyl-tin-dilaurate-catalyzed boards except that the hold at 800 psig was increased to 40 seconds. The resulting panels were well-bonded.

When the above panels were tested, the following results were obtained:

TABLE I

| Set | Catalyst | Tensile Strength | Flexure | Flex Modulus | Internal Bond |
|---|---|---|---|---|---|
| 1 | dibutyltin | 22685 psig | — | — | 241 psig |
| 2 | DABCO | 17523 psig | — | — | 63 psig |
| 3 | DABCO | 17112 psig | 19836 | $1.5 \times 10^6$ | 383 psig |

In Table I, the presence of a catalyst in the resins of Sets 1 and 2 appeared to detrimentally influence the mechanical properties of the composite panels. This was evidenced by the "blows" in Set 1 panels produced with a 6-second first open to atmospheric pressure, and by the lack of interply adhesion in Set 2 panels unless the cure temperature was reduced from 204° C. to 149° C. This implies that varying degrees of precure occurred, yielding reduced strength. Even the internal bond strength of Set 1 panels is low compared to what would be expected for a resin containing propylene carbonate. The internal bond strength of Set 3 is improved over Sets 1 and 2 and may reflect the fact that the catalyst was preapplied to the sheet before application of the PMDI resin, thereby minimizing the time that PMDI and the catalyst were together before curing. Set 3 also exhibited twice the resin loading level (relative to Set 2) which should result in improved physical properties, even though the tensile strength is lower than expected.

EXAMPLE 8

In accordance with this Example, 58-lb basis weight kraft linerboard sheets were impregnated with PMDI diluted with 10% w/w propylene carbonate at a 15% loading level. Substrates containing two and three plies of this impregnated linerboard were prepared utilizing the following press cycle on a heated 2'×2' flat press at a temperature of 385° F.

Close to 400 psig for 16 seconds; hold at 400 psig for 4 seconds; open for 8 seconds (a breathe cycle); close to 800 psig for 10 seconds; hold at 800 psig for 40 seconds; and open the press for 6 seconds.

The above press cycle resulted in a cured polyisocyanate impregnated laminated substrate material.

Uncured melamine-plastic overlay sheets, available from Riverside Laboratories, Inc. of Geneva, Ill., were then placed respectively on one exterior side (major surface) of each of the respective cured substrates and cured utilizing the following press cycle with the press temperature being 365° F.

Close to 250 psig for 10 seconds; hold at 250 psig for 120 seconds; and open the press.

Uncured polyester overlay sheets from Riverside Laboratories, Inc. were also placed over the cured substrate sheets and subjected to the same press cycle as the melamine overlay sheets.

The overlays adhered well and the resulting laminate appeared well made. This demonstrated the suitability of polyisocyanate-impregnated substrates with plastic laminate overlays. Some warpage of the laminate was observed at the edges, which is expected to be cured with a cooling cycle.

The use of organic polymer overlays over a polyisocyanate impregnated cellulose substrate offers a number of advantages, including enhanced durability, as explained below. An additional advantage over commercially available products which contain phenolic containing interplies is that polyisocyanate substrates are of lower cost, faster curing (when cured utilizing heat and pressure) and are free of formaldehyde.

Other specific examples of organic polymer overlay sheets besides melamine-formaldehyde and polyester, are urea-formaldehyde and phenolic sheets. These sheets being combined with the polyisocyanate impregnated cellulose substrate core. Other organic polymer overlays may also be used.

Samples prepared in accordance with Example 8 were then tested for water absorption characteristics and also impact resistance.

Table 2 below sets forth the water absorption characteristics of the specified samples. The time listed in the columns of this table are the times during the specific sample was immersed in water at ambient conditions. In this Table, the "substrate with no overlay" refers to a three-ply 58-lb kraft liner laminated substrate (about 0.03 inches thick) prepared and cured in accordance with Example 8, above. In addition, the reference to "Wilsonart ® control" refers to the decorative plastic laminate sold under the brand name Wilsonart ® having a polymer surface (believed melamine-plastic) over a phenolic containing substrate. The specific Wilsonart ® sample used as a control was about 0.030 inches thick. The reference to the "polyester overlay" in the table refers to a substrate identical to the control substrate and which has been overlaid on one major exterior surface with polyester sheet material from Riverside Laboratories, Inc., the total thickness of this "polyester overlay" material being about 0.035 inches thick. In this case, the overlay was accomplished utilizing the procedure of Example 8, above. Similarly, the reference to the "melamine overlay" material refers to the sheet product having a substrate which is identical to the control substrate and which has been overlaid on one major exterior surface with a melamine-plastic overlay sheet from Riverside Laboratories, Inc., which was cured and secured to the substrate as explained above in Example 8. The total thickness of the "melamine overlay" material was about 0.035 inches thick. In Table II, the two numbers for the "polyester overlay" sheet material in each column and for the "melamine overlay" sheet material in each column refer to the results from two separate test samples. In each case, the polyester and melamine overlay materials had good water absorption characteristics, although not quite as good as the Wilsonart ® material. However, the properties were much better than the control substrate without the overlay.

TABLE II

Properties of Overlayed Polyisocyanate Impregnated Substrate
% Water Absorption After Ambient Water Soak

| Sample | 2 Hr. Soak | 24 Hr. Soak | 48 Hr. Soak |
|---|---|---|---|
| Substrate with no overlay control | 18.3 | 33.8 | 34.8 |
| Wilsonart ® control | 5.3 | 15.9 | 16.9 |
| Polyester overlay | 7.3, 6.6 | 19.9, 17.8 | 23.7, 20.9 |
| Melamine overlay | 6.3, 7.4 | 15.9, 18.4 | 19.2, 22.3 |

Thus, from these test results, it is apparent that the polyester overlay and melamine overlay materials are very satisfactory for countertop and other applications.

Table III below describes the resistance of the samples to deformation (indentation) and breakage when impacted by a falling ball. These tests were performed in accordance with ASTM Test Standard D 1037-89, paragraphs 91-95. In this test, a two-inch (50-mm) diameter steel ball is dropped on a panel from increasing heights, each drop being made on the center of the panel. The height of the drop in inches which produces a visible failure on the opposite surface of the test sample from the surface receiving the impact is recorded as the index of resistance to impact. In performing this test, two heights were recorded, the first being when an indentation was observed. The second recorded height corresponded to when breakage of the test sample occurred. During these tests, the samples were supported at their periphery and where not placed on any supporting materials.

TABLE III

Falling Ball Impact Test Results

| Sample | Indentation Height (In.) | Break Through Height (In.) |
|---|---|---|
| Substrate with no overlay | 18 | 20 |
| Wilsonart ® control | 4 | 7 |
| Polyester overlay | 12, 8 | 14, 10 |
| Melamine overlay | 12, 10 | 18, 12 |

As is apparent from the table above, the polyester overlay and melamine overlay laminates in accordance with the present invention were far superior in their indentation height and break-through height properties than the tested Wilsonart ® control sample. Thus, plastic laminate materials produced in accordance with the present invention utilizing a polyisocyanate impregnated cellulose substrate are extremely durable.

It is expected that plastic laminate materials prepared utilizing substrates produced in accordance with Example 4 above will have properties which will be at least as good as the above.

EXAMPLE 9

In accordance with this specific Example, the procedure of Example 8 was repeated, except that the polyisocyanate impregnated cellulosic sheets were not precured. Instead, the impregnated cellulosic sheets and uncured overlay sheets were assembled and pressed at once, utilizing the press cycle of Example 8. This resulted in simultaneous curing of the substrate and the overlay materials as well as bonding of the overlay materials to the substrate. Although beneficial, this latter procedure did result in some blistering under the overlay sheet, possibly from volatiles released during the curing of the substrate.

Having illustrated and described the principles of my invention in several preferred embodiments and multiple examples, it should be apparent to those skilled in the art that the invention can be modified in arrangement and detail without departing from such principles. I claim all modifications coming within the spirit and scope of the following claims.

I claim:

1. A product comprising:
   a substrate comprising a cellulosic material impregnated with a cured polyisocyanate resin, the polyisocyanate resin comprising a polyisocyanate compound selected from a group consisting of lower ($C_1$-$C_{12}$) aliphatic polyisocyanates, alicyclic polyisocyanates, aromatic polyisocyanates, and mixtures thereof; and
   an overlay material extending over and secured to the substrate, the overlay material comprising an organic polymer selected from a group consisting of melamine-plastics, phenolics, urea-formaldehyde plastics, and polyesters.

2. A product according to claim 1 in which the overlay material is cured, wherein the substrate is cured prior to curing the overlay material.

3. A product according to claim 1 in which the overlay material is cured, wherein the substrate is cured simultaneously with the overlay material.

4. A laminated product according to claim 1 in which the overlay material is cured and in which the substrate is cured, wherein the substrate and the overlay material are each cured prior to securing the overlay material to the substrate.

5. A product according to claim 1 in which the substrate is formed in the following manner:
   impregnating a substantially delignified cellulosic material with the polyisocyanate resin, the polyisocyanate resin comprising the polyisocyanate compound and an organic solvent for the polyisocyanate compound, where the solvent comprises up to about 20% w/w of the polyisocyanate resin and the polyisocyanate resin constitutes about 8% to about 20% w/w of the substrate, so as to form the substrate; and
   curing the substrate at a temperature within a range of about 105° to about 245° C. for a time not exceeding about 5 minutes and at a pressure within a range of about 130 to about 1200 psig.

6. The product of claim 5 in which the cellulosic material is in a sheet form having first and second sheet surfaces substantially parallel to each other and a Z or thickness dimension extending in a direction between the first and second sheet surfaces perpendicular to the first and second sheet surfaces, and wherein the polyisocyanate resin is substantially uniformly distributed throughout the Z or thickness dimension of the sheet after impregnating the sheet with the polyisocyanate resin.

7. The product of claim 1 in which the polyisocyanate compound is poly(diphenylmethane diisocyanate).

8. The product of claim 5 in which the solvent is selected from the group consisting of alkylene carbonates, aromatics, halogenated aromatics, nitroaromatics, alkylated aromatics, ethers, ketones, and alkyl acetates.

9. The product of claim 5 wherein the solvent is propylene carbonate.

10. A product according to claim 5 in which the cellulosic material used in forming the substrate has a moisture content not exceeding about 10% w/w relative to the mass of the cellulosic material.

11. A product according to claim 5 in which the polyisocyanate resin includes a catalyst.

12. The product of claim 11 in which the catalyst is present in the polyisocyanate resin in a concentration within a range of about 0.1 to about 0.5% w/w relative to the polyisocyanate resin.

13. The product of claim 11 in which the catalyst is selected from the group consisting of diazobicyclooctane, tin octoate, and dibutyltin dilaurate.

14. The product of claim 5 in which the cellulosic material is selected from the group consisting of pulped cellulose fibers; chemical pulps; thermo-mechanical pulps; bleached and unbleached paper and paper-like materials, non-woven mats, sheets, and felts.

15. The product of claim 5 in which the solvent comprises from about 5% w/w to about 20% w/w relative to the polyisocyanate resin.

16. The product of claim 15 in which the polyisocyanate resin includes a catalyst in a concentration within a range of about 0.1% to about 0.5% w/w relative to the polyisocyanate resin.

17. The product of claim 1 in which the substrate is formed of a stack of at least two cellulosic material sheets which are each impregnated with polyisocyanate resin, the stacked sheets being cured together to form the substrate.

18. The product of claim 3 in which the substrate is formed of a stack of at least two cellulosic material sheets which are each impregnated with polyisocyanate resin, the stacked sheets being cured together to form the substrate.

* * * * *